United States Patent [19]

Amos et al.

[11] Patent Number: 4,774,551
[45] Date of Patent: Sep. 27, 1988

[54] PHOTOGRAPHIC PRINTER

[75] Inventors: Shaun M. Amos; Richard J. Backus; Yonathan Preiss, all of Rochester, N.Y.

[73] Assignee: Eastman Kodak Company, Rochester, N.Y.

[21] Appl. No.: 122,991

[22] Filed: Nov. 19, 1987

[51] Int. Cl.$^4$ .................. G03B 27/74; G03B 27/80
[52] U.S. Cl. .......................... 355/68; 355/38
[58] Field of Search .............. 355/38, 68, 71, 41, 355/8335, 5; 356/225; 250/216, 350/96.24

[56] References Cited

U.S. PATENT DOCUMENTS

| | | | |
|---|---|---|---|
| 3,115,807 | 12/1963 | Craig et al. | 355/38 X |
| 3,195,405 | 7/1965 | Clark et al. | 350/96.24 |
| 3,263,556 | 8/1966 | Mey | 355/38 |
| 3,672,768 | 6/1972 | Schaub et al. | 355/38 |
| 3,914,721 | 10/1975 | Pollock | 355/35 |
| 3,923,393 | 12/1975 | Inove et al. | 355/35 |
| 4,172,659 | 10/1979 | Laska | 355/68 |
| 4,286,868 | 9/1981 | Laska | 355/68 |
| 4,320,976 | 3/1982 | Obertegger | 355/38 X |
| 4,464,045 | 8/1984 | Findeis et al. | 355/38 |
| 4,519,694 | 5/1985 | Kashiwaga | 355/5 |
| 4,642,684 | 2/1987 | Alkofer | 355/38 X |
| 4,666,307 | 5/1987 | Matsumoto et al. | 355/38 X |

OTHER PUBLICATIONS

USSN 900,551, Aug. 26, 1986, Patrick A. Cosgrove and Michael T. Wolf, PHOTOGRAPHIC CONTROL DEVICE.

Primary Examiner—Richard A. Wintercorn
Attorney, Agent, or Firm—Jeffrey L. Brandt

[57] ABSTRACT

A photographic printer for exposing a photographic transparency onto a photosensitive medium, the photographic printer including a source of illumination for projecting light through the photographic transparency, a light sensor for sensing selected characteristics of the light projected through the photographic transparency, and a combination filter and shutter apparatus. The combination filter and shutter apparatus includes a rotatable wheel defining an exposure aperture, a calibration region for use in calibrating the light sensor, at least one opaque region of suitable size for blocking the light output of the source of illumination, and a neutral density filter region. Control means are provided for rotating the wheel to selectively position the calibration region between the source of illumination and the light sensor to enable the calibration of the light sensor. The control means further functions to selectively position the exposure aperture, neutral density filter region, or the opaque region between the source of illumination and the photosensitive medium to control the exposure of the photosensitive medium.

19 Claims, 3 Drawing Sheets

PHOTOGRAPHIC PRINTER

The subject invention relates generally to photographic printers and more specifically to a photographic printer wherein a neutral density filter, light sensor calibration filter, dark shutter, and exposure aperture are all included on a single rotatable wheel disposed intermediate a source of illumination and a photographic transparency.

BACKGROUND OF THE INVENTION

In a typical photographic printer, a lamphouse is provided for projecting light of appropriate color and density through a photographic negative to expose the negative onto a photographic paper. A light sensor, such as a photocell, is disposed so as to measure the light projected through the negative, whereby to determine an appropriate exposure for the negative. The output of the light sensor is fed back, for example through an exposure control computer, to the lamphouse so as to control the light output of the lamphouse and provide a proper exposure of the negative. The lamphouse may include, for example, controllable colored filter paddles and/or attenuator wheels for providing the proper light output.

Certain features are required for the proper operation of such a printer. Separate from the lamphouse, a shutter mechanism is required for precisely controlling the timing of the exposure light. A neutral density filter is required, typically supported on its own controllable paddle, for selectively modifying the intensity of the light output by the lamphouse. A calibration filter is necessary for calibrating the response of the light sensor. This calibration filter is often provided in a negative size format for insertion into a negative gate by an operator. Alternatively, the calibration filter may be provided on a separately controllable paddle for selective introduction into the light path.

These features, i.e. the shutter mechanism, neutral density filter, and calibration filter, constitute a substantial amount of the space and technical complexity of the photographic printer.

SUMMARY OF THE INVENTION

A principle object of the present invention is to provide a photographic printer, including a rotatable disc functioning as a shutter and calibration filter, which is relatively compact, straight-forward in construction, and inexpensive in comparison to the prior art.

Another object of the present invention is to provide a method of operating a photographic printer, including controlling a rotatable disc which functions as a shutter and a calibration filter, which is relatively economical in comparison to the prior art.

In accordance with the present invention, a new and improved photographic printer is provided for exposing a photographic transparency onto a photosensitive medium. The photographic printer includes a source of illumination for projecting light through the photographic transparency, and a light sensor for sensing selected characteristics of the light projected through the photographic transparency. A combination filter and shutter apparatus is provided, comprising a rotatable wheel defining an exposure aperture, a calibration region for use in calibrating the light sensor, and at least one opaque region of suitable size for blocking the light output of the source of illumination. Further provided are control means for rotating the rotatable wheel to selectively position the calibration region between the source of illumination and the light sensor to enable the calibration of the light sensor, and to selectively position the exposure aperture or the opaque region between the source of illumination and the photosensitive medium to control the exposure of the photosensitive medium.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which like reference numerals are carried forward, and in which:

DETAILED DESCRIPTION OF THE INVENTION

Figure 1:
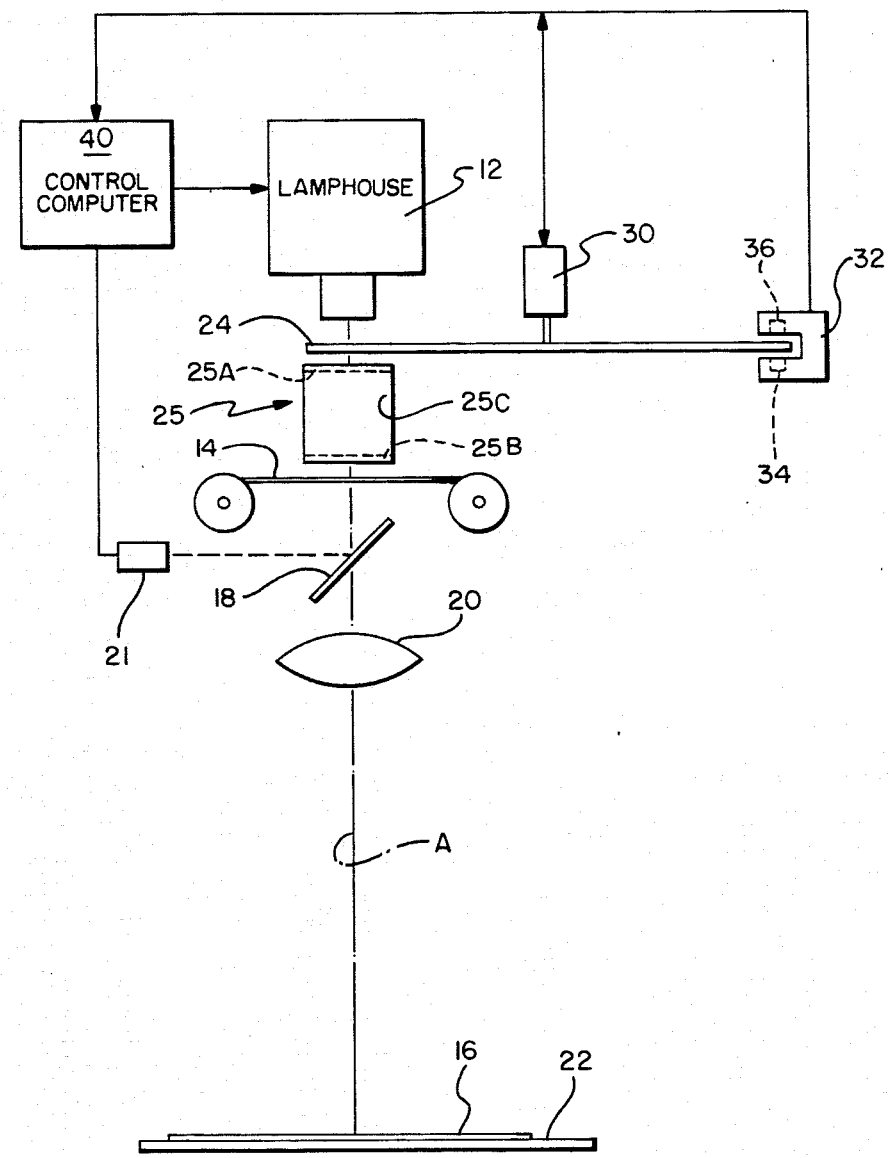
FIG. 1 is a schematic view of a photographic printer constructed in accordance with the present invention.

Referring now to FIG. 1, a photographic printer 10 is shown including a lamphouse 12 for projecting light along an optical printing axis A to expose a photographic negative 14 onto a photographic paper 16. Intermediate negative 14 and paper 16 are, respectively, a beamsplitter 18 and a printing lens 20. A light sensor 21, for example a photocell, is disposed so as to sense the portion of light reflected off of optical axis A by beamsplitter 18. It will be understood that light sensor 21 can comprise one or multiple sensor elements for sensing multiple colors. A platen 22 is provided for supporting paper 16.

Disposed intermediate lamphouse 12 and negative 14 is a rotatable filter wheel 24. Disposed intermediate filter wheel 24 and photographic negative 14 is a light integrator box 25. Light integrator box 25 is of the conventional type, comprising, for example, opposing diffusers 25A, 25B, and a reflective inner surface 25C.

Figure 2:
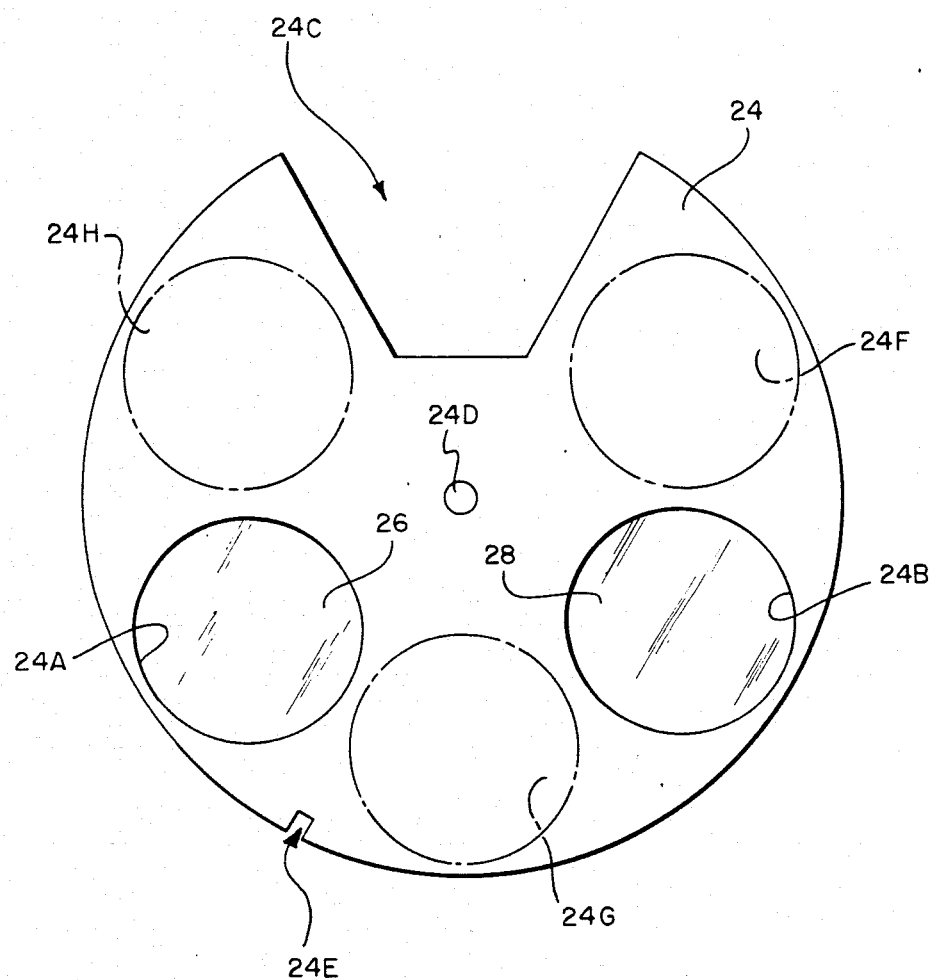
FIG. 2 is a plan view of the rotatable wheel of FIG. 1.

Filter wheel 24 is constructed from an opaque material such as steel, and, as is best shown in FIG. 2, defines at least five apertures designated at 24A, 24B, 24C, 24D, and 24E. Apertures 24A, 24B are generally round and disposed proximate the periphery of filter wheel 24, with the former supporting a calibration filter 26 and the latter supporting a neutral density filter 28. Calibration filter 26 comprises, for example, a 1.0 plus-or-minus 0.05 neutral-density inconel for calibrating the response of light sensor 21. Neutral density filter 28 comprises, for example, a selected, neutral-density inconel for modifying the intensity of the light output of lamphouse 12.

It will be noted that, while the neutral density filter has so far been shown and described as a filter 28 supported in an aperture 24B, the invention is not so limited. Alternatively, a neutral density filter could be formed within the region depicted as aperture 24B by simply providing a selected hole pattern through wheel 24. Such a hole pattern is selected to pass a desired percentage of the light generated by lamphouse 12. Examples of such types of neutral density filters are shown in U.S. Pat. No. 3,195,405 to Clark et al., incorporated herein by reference.

Continuing with FIG. 2, aperture 24C is a generally V-shaped notch extending inwardly from the circumferential edge of filter wheel 24. Aperture 24D comprises a small mounting hole at the center of filter wheel 24, while aperture 24E comprises a small, rectangular notch on the circumferential edge of the filter wheel. Apertures 24A, 24B, 24C are spaced at relatively regular intervals (i.e. about 120 degrees apart) about filter wheel 24. Apertures 24A, 24B, 24C, are appropriately sized such that, when positioned in front of lamphouse 12, substantially all of the light projected by the lamphouse passes through the aperture or the filter supported therein. As shown by dashed-lines 24F, 24G, 24H, filter wheel 24 further defines three opaque, or dark shutter regions of a size appropriate for blocking the light output of lamphouse 12.

Referring again to FIG. 1, a stepper motor 30 is connected to central aperture 24D of filter wheel 24 for rotating the filter wheel. A position sensor 32, including a light emitter 34 and detector 36 is disposed overlapping the circumferential edge of filter wheel 24 for sensing the position of aperture 24E. Lamphouse 12, stepper motor 30, position sensor 32, and light sensor 21 are all connected to a control computer 40.

Figure 4:
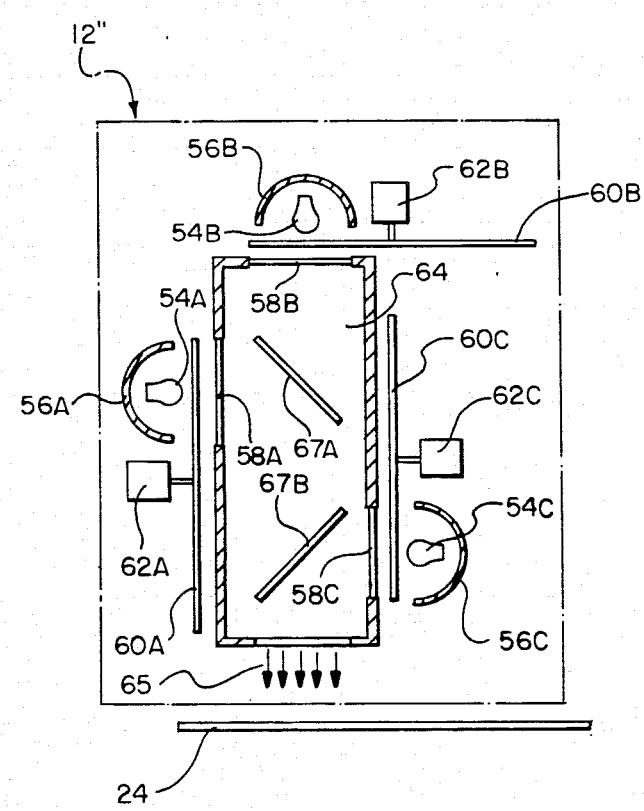

Referring now to FIGS. 4 and 5, two alternate constructions for lamphouse 12 are shown, indicated at 12' and 12", respectively. It will be understood that these constructions are depicted schematically and represent typical lamphouse constructions known to those skilled in the art.

Figure 3:
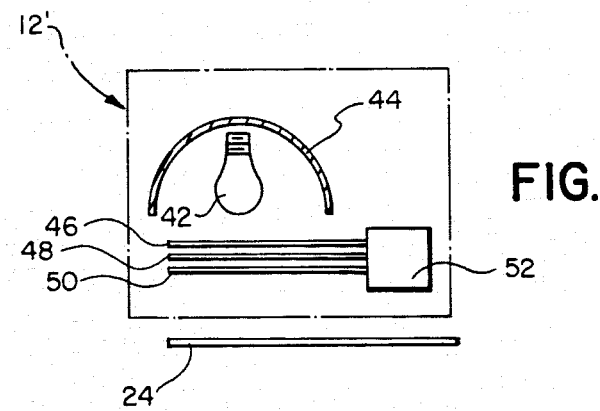
FIGS. 3 and 4 show schematic views of alternate constructions for the lamphouse of FIG. 1.

Examining first FIG. 3, lamphouse 12' is of the type comprising a single lamp 42 and reflector 44 for generating white light. Controllable filters, such as Red, Green, and Blue additive filters, or Cyan, Yellow, and Magenta subtractive filters, indicated at 46, 48, 50, are supported on appropriate paddles/supports controlled by a filter controller mechanism 52. In operation, control computer 40 (FIG. 1) is connected to filter controller mechanism 52 for selectively moving the filters 46, 48, 50 into or out of the light path whereby to control the exposure of negative 14 (FIG. 1).

Examining now FIG. 4, lamphouse 12" is of the type including three separate lamps 54A, 54B, 54C, each surrounded by a corresponding reflector 56A, 56B, 56C, and fronted by a corresponding filter 58A, 58B, 58C. Filters 58A–C comprise, respectively, Red, Green, and Blue additive filters or Cyan, Yellow, and Magenta subtractive filters. Intermediate each lamp 52A, 54B, 54C and its corresponding filter 58A, 58B, 58C, is a corresponding, rotatable attenuator wheel 60A, 60B, 60C. Each attenuator wheel 60A, 60B, 60C is connected to a corresponding, servo- or stepper-motor 62A, 62B, 62C. Each filter 58A, 58B, 58C fronts on a common mixing chamber 64, such that the light outputs of lamps 54A, 54B, 54C are first colored, then mixed to form a common exposure light 65. Two neutral density, glass beamsplitters 67A, 67B are disposed in mixing chamber 64 for facilitating this light mixing. In operation, control computer 40 (FIG. 1) is individually connected to each motor 62A, 62B, 62C so as to control attenuator wheels 60A, 60B, 60C, whereby to provide a light output from lamphouse 12" appropriate for providing a correct exposure for negative 14 (FIG. 1).

In operation, photographic printer 10 is controlled by control computer 40 to expose negative 14 onto paper 16. In accordance with the present invention, the shutter function, and the selective insertion of neutral density filter 28 or calibration filter 26 onto optical printing axis A and hence into the printing light path, are performed using rotatable filter wheel 24. While many sequences of operation for printer 10 will be readily apparent to those skilled in the art, for purposes of example, one sequence will be described in detail below.

To initialize the operation of printer 10, for example immediately after powering up the printer, computer 40 controls the rotation of filter wheel 24 via steppermotor 30 until aperture 24E is detected in position sensor 32. This position is obtained when the output of light emitter 34 is detected by light detector 36 through aperture 24E. Filter wheel 24 is thus "initialized" to a known starting position. For purposes of explanation, it will be assumed that with filter wheel 24 so initialized, opaque, dark shutter region 24F of the filter wheel is centered on the optical printing axis A.

Light sensor 21 is then calibrated by positioning calibration filter 26 on optical axis A. This positioning is accomplished by computer 40 controlling steppermotor 30 to rotate filter wheel 24 a predetermined angular distance in the clockwise (CW) direction (as viewed in FIG. 2). Lamphouse 12 is then activated by computer 40 to generate a light output of known intensity and color composition. The output of light sensor 21 is ready by computer 40 and, in a manner well known to those skilled in the art, calibrated to a known reference level. For purposes of explanation, it will be understood that all rotations of filter wheel 24 are accomplished through the control of stepper-motor 30 by computer 40.

An appropriate exposure for negative 14 is determined, without paper 16 in position, by rotating filter wheel 24 in a counter-clockwise (CCW) direction to position aperture 24C in the optical printing path on axis A. Lamphouse 12 is activated, and light sensor 21 is used to measure selected density characteristics of negative 14. Control computer 40 reads the output(s) of light sensor 21, and calculates the appropriate exposure for negative 14. Many exposure determination algorithms are available for calculating an appropriate exposure, several of which will be readily known to those skilled in the art.

Upon reading the output of light sensor 21, filter wheel 24 is rotated further CCW such that opaque region 24F is positioned to block all light output from lamphouse 12. Paper 16 is then positioned on platen 22.

Dependant on the exposure calculated by computer 40, filter wheel 24 is next rotated in a clockwise direction to position aperture 24C in the printing light path, or in a CCW direction to position neutral density filter 28 in the light path. This is, of course, determined by the light intensity necessary for the appropriate exposure of negative 14. Computer 40 then controls the positioning of the filters 46, 48, 50 (lamphouse 12' of FIG. 3) or attenuator wheels 60A, 60B, 60C (lamphouse 12" of FIG. 4) to effect proper exposure of negative 14 onto paper 16. Filter wheel 24 is then rotated so as to position the nearest opaque region 24E, 24F, 24H in the optical printing path and thereby terminate the exposure.

The above described sequence is repeated to print subsequent negatives, with the exception of the step of calibrating light sensor 21. Calibration of light sensor 21 is optional, and need only be performed as is operationally required.

It will be appreciated that, while one particular operating sequence for printer 10 has been described, it is not the only suitable sequence. Indeed, one of the advantages of using filter wheel 24 in accordance with the present invention is its adaptability to many sequences. This adaptability is enhanced by the feature of including three dark shutter regions 24E, 24F, 24H, such that one such shutter is always conveniently available for terminating exposure.

There is thus provided a photographic printer including a combination shutter and filter apparatus wherein a neutral density filter, a light sensor calibration filter, and dark and open shutter regions are all incorporated on a single, rotatable filter wheel. The rotation of the filter wheel is controllable with a single stepper motor. The shutter, light sensor, and neutral density filter operations are thus all accomplished using a relatively straight-forward, compact, and inexpensive apparatus in comparison to the various separate apparatus used in the prior art.

While a preferred embodiment of the invention has been illustrated and described, it will be clear that the invention is not so limited. Numerous modifications, changes, variations, substitutions and equivalents will occur to those skilled in the art without departing from the spirit and scope of the present invention.

What is claimed is:

1. In a photographic printer for exposing a photographic transparency onto a photosensitive medium, said photographic printer including a source of illumination for projecting light through said photographic transparency, and a light sensor for sensing selected characteristics of the light projected through said photographic transparency, a combination filter and shutter apparatus, comprising:
    a rotatable wheel defining an exposure aperture, a calibration region for use in calibrating said light sensor, and at least one opaque region of suitable size for blocking the light output of said source of illumination; and
    control means for rotating said wheel to selectively position said calibration region between said source of illumination and said light sensor to enable the calibration of said light sensor, and for selectively positioning said exposure aperture or said opaque region between said source of illumination and said photosensitive medium to control the exposure of said photosensitive medium.

2. Apparatus in accordance with claim 1 wherein:
    said rotatable wheel further defines a neutral density region; and
    said control means further functions to rotate said rotatable wheel so as to selectively position said neutral density region between said source of illumination and said photosensitive medium to control the exposure of said photosensitive medium.

3. Apparatus in accordance with claim 1 wherein said control means includes means for determining the position of said exposure aperture, calibration region, and opaque region relative to said source of illumination.

4. Apparatus in accordance with claim 3 wherein said position determining means comprises:
    a notch in said rotatable wheel proximate the perimeter thereof; and
    means fixed relative to said rotatable wheel for sensing said notch.

5. Apparatus in accordance with claim 1 wherein said calibration filter region comprises:
    said rotatable wheel defining a calibration aperture; and
    a calibration filter of known transmissive characteristics supported in said calibration aperture.

6. Apparatus in accordance with claim 5 wherein said calibration filter comprises a 1.0 plus-or-minus 0.05 neutral density inconel.

7. Apparatus in accordance with claim 2 wherein said neutral density filter region comprises:
    said rotatable wheel defining a neutral density aperture; and
    a neutral density filter supported in said aperture.

8. Apparatus in accordance with claim 2 wherein said neutral density filter region comprises a pattern of small holes through said rotatable wheel.

9. Apparatus in accordance with claim 2 wherein said neutral density filter region, said calibration filter region, and said exposure aperture are regularly spaced at approximately 120 degree intervals about said rotatable wheel.

10. Apparatus in accordance with claim 9 wherein said rotatable wheel defines three of said opaque regions, one defined between said exposure aperture and said neutral density filter region, one defined between said neutral density filter region and said calibration filter region, and one defined between said calibration filter region and said exposure aperture.

11. Apparatus in accordance with claim 1 and further including a light integrator box disposed between said rotatable wheel and said photographic transparency.

12. Apparatus in accordance with claim 1 wherein said photographic printer further includes means for holding said photographic transparency; and
    said rotatable wheel is disposed between said source of illumination and said means for holding said photographic transparency.

13. Apparatus in accordance with claim 3 wherein said control means includes a computer connected to said light sensor, said source of illumination, said position determining means, and said rotatable wheel.

14. Apparatus in accordance with claim 13 wherein said control means further includes a motor connected between said computer and said rotatable wheel.

15. A method of operating a photographic printer to expose a photographic transparency onto a photosensitive medium, said photographic printer including a source of illumination for projecting light through said photographic transparency, and a light sensor for sensing selected characteristics of the light projected through said photographic transparency, said method comprising the steps of:
    providing a rotatable wheel defining an exposure aperture, a calibration filter region for use in calibrating said light sensor, and at least one opaque region of suitable size for blocking the light output of said source of illumination; and
    rotating said rotatable wheel to selectively position said calibration filter between said source of illumination and said light sensor so as to enable the calibration of said light sensor, and so as to selectively position said exposure aperture or opaque region between said source of illumination and said photosensitive medium to control the exposure of said photographic medium.

16. A method in accordance with claim 15 wherein said photographic printer further includes means for holding said photographic transparency; and
    said rotatable wheel is disposed between said source of illumination and said means for holding said photographic transparency.

17. A method in accordance with claim 15 wherein:

said rotatable wheel further defines a neutral density region; and further including the step of rotating said rotatable wheel so as to selectively position said neutral density region between said source of illumination and said photosensitive medium to control the exposure of said photosensitive medium.

18. A method in accordance with claim 17 wherein said neutral density filter region, said calibration filter region, and said exposure aperture are regularly spaced at approximately 120 degree intervals about said rotatable wheel.

19. A method in accordance with claim 18 wherein said rotatable wheel defines three of said opaque regions, one between said exposure aperture and said neutral density filter region, one between said neutral density filter region and said calibration filter region, and one between said calibration filter region and said exposure aperture.

* * * * *